(12) United States Patent
Schumann et al.

(10) Patent No.: US 6,575,278 B1
(45) Date of Patent: Jun. 10, 2003

(54) DRIVE ACTING ON BOTH SIDES FOR ADJUSTMENT DEVICES

(75) Inventors: Peter Schumann, Untersiemau (DE); Georg Scheck, Weitramsdorf (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/009,058

(22) PCT Filed: May 31, 2000

(86) PCT No.: PCT/DE00/01810

§ 371 (c)(1),
(2), (4) Date: Dec. 3, 2001

(87) PCT Pub. No.: WO00/75534

PCT Pub. Date: Dec. 14, 2000

(30) Foreign Application Priority Data

Jun. 4, 1999 (DE) .......................................... 199 27 033

(51) Int. Cl.[7] .............................................. F16H 31/00
(52) U.S. Cl. .......................... 192/19; 192/15; 192/43.1; 74/143; 297/367
(58) Field of Search ........................ 192/15, 19, 223.1, 192/43.1; 74/143; 297/367

(56) References Cited

U.S. PATENT DOCUMENTS 3,008,765 A * 11/1961 Tischler et al. ............. 297/367
5,692,589 A * 12/1997 Beguin ........................ 192/39
5,865,285 A    2/1999 Minkenberg et al. ......... 192/15
5,881,854 A * 3/1999 Rougnon-Glasson ........ 192/15
5,918,714 A * 7/1999 Kadereit ...................... 192/15
6,253,894 B1   7/2001 Schumann et al. ........... 192/15
6,488,134 B2 * 12/2002 Becker et al. ................ 192/19

FOREIGN PATENT DOCUMENTS

| DE | 195 27 912 | 8/1996 |
| DE | 195 40 631 | 5/1997 |
| DE | 197 25 899 | 12/1998 |

* cited by examiner

*Primary Examiner*—Saul Rodriguez
(74) *Attorney, Agent, or Firm*—Christie, Parker & Hale, LLP (57) ABSTRACT

The invention relates to a drive acting on both sides for adjustment devices, including a rotationally mounted drive lever for producing a rotational movement that can be selectively effected in one direction of rotation or in the other direction of rotation, a drive wheel that can only be rotated when the drive lever is moved from a zero point position, at least a one-piece coupling element having two coupling areas for transmitting a torque to the drive wheel, in addition to a sliding block guide with areas for controlling the coupling element. The coupling element can be displaced radially and is tiltably mounted in a guide and coupled by both coupling areas in the zero point position of the drive lever to the drive wheel in an elastic manner so that the non-loaded coupling area is uncoupled from the drive wheel by the sliding block guide when the drive lever moves from the zero point position and remains uncoupled when the drive lever moves in the opposite direction.

27 Claims, 7 Drawing Sheets

DRIVE ACTING ON BOTH SIDES FOR ADJUSTMENT DEVICES

CROSS-REFERENCE TO RELATED APPLICATION

This application claims priority of International application number PCT/DE00/01810, filed May 31, 2000, which in turn claims priority to German patent application number 199 27 033.3, filed Jun. 4, 1999.

FIELD OF INVENTION

The invention relates to a drive acting on both sides for adjustment devices. The invention is intended in particular for the adjustment of vehicle seat components such as seat backs and seat cushions.

BACKGROUND OF INVENTION

From DE 195 27 912 A1 a drive acting on both sides is known where a drive lever is mounted on a drive axle and supports swivel coupling elements whose free ends provided with toothed elements can be brought into engagement with the teeth mounted around the circumference of a drive wheel. The swivel coupling elements are associated with a sliding block guide which lifts the relevant unloaded coupling element from the gearing of the drive wheel according to the swivel direction of the drive lever. Spring areas are thereby provided on both sides and outside of the sliding block guide to exert on the coupling elements a force directed against the engagement direction of the teeth so as to prevent any so-called ratchet or rattling noises.

The drawback with the adjustment drive known from DE 195 27 912 A1 is in the first place the relatively large number of parts. In particular two independent coupling elements are required for an adjustment on both sides; this is linked with a correspondingly large structural space taken up by the adjustment drive. Secondly an expensive construction is required in order to guide the coupling elements in a defined manner and to prevent the teeth of the coupling elements from catching on the teeth of the drive wheel when the drive lever is returned to the zero point position.

SUMMARY OF THE INVENTION

Starting from the prior art the object of the invention is to provide a drive acting on both sides which produces a rotary movement, which uses a small number of individual parts, is simple to assemble and is characterised by a compact construction. The drive during use should operate substantially free of play and produce no switching or rattling noises.

The solution according to the invention proposes that the coupling element is mounted for both radial displacement and tilting movement in a guide whereby the two coupling areas are coupled spring-elastically to the drive wheel when the drive lever is in the zero point position. When the drive lever is moved out of the zero point position the non-loaded coupling area is uncoupled from the drive wheel through the sliding block guide and remains uncoupled when the drive lever is moved in the opposite direction, thus moved towards the zero point position.

Although play is required owing to the one-piece design of the coupling element, the drive appears subjectively free of play since the actual idling path which has to be covered up to rotation of the drive wheel is loaded through the spring-elastic pretension. This pretension can be produced for example by a coil spring which is supported on one side radially on the drive lever and on the other side on the coupling element, whereby the coupling area is pressed into the associated coupling area of the drive wheel. By way of example a coil spring presses the coupling element against the drive wheel whereby the movement of the drive lever overall is found to be free of play. Furthermore with the solution according to the invention no engagement click occurs since the coupling element is brought smoothly through the resilient tension into an entrainment position and not merely by applying a drive force.

In order to ensure a secure accurate guide of the coupling element in the radial direction a guide element is provided which is connected to the coupling element and which engages in a recess of the drive lever. This recess thereby extends in the radial direction and is formed for example as an oblong hole.

In an alternative embodiment the guide element is mounted on the drive lever and the radial recess which acts as a type of slide guide is worked into the coupling element. The guide element can be connected in one assembly process, for example by welding, riveting or screwing, to the drive lever or to the coupling element or can be formed by pressing or drawing. The recess is normally punched out. Similarly, the formation of the recess is possible in a re-shaping process.

Under certain circumstances it can be favourable in order to guarantee a uniform substantially non-jerky movement of the guide element to provide a slide block which connects the guide element to the radial recess. Through the slide block it is possible to produce a favourable friction pairing irrespective of the material of the guide element and of the component part enclosing the recess.

This recess is preferably dimensioned so that with maximum displacement of the coupling element towards the drive axle both coupling areas are not exactly coupled to the drive wheel. It is thereby reached that the play of the adjustment drive is minimal.

According to the invention a spring is mounted between a housing of the adjustment drive and the coupling element wherein the spring biases the coupling element radially in the direction of the drive wheel so that the two coupling areas in the zero point position of the drive lever reliably adjoin the drive wheel.

In one embodiment of the invention a spring is provided between the drive lever and the coupling element whereby it is favourable if the spring is mounted between the drive lever and a guide element of the coupling element.

In order to ensure a definite engagement of the coupling areas with the drive wheel it is advantageous to provide a keyed connection to transfer the force applied through the drive lever. To this end both the coupling areas of the coupling element and the circumference of the drive wheel are provided with teeth which are associated with each other so that the two toothed areas can engage in each other. The teeth of the drive wheel can thereby be formed as internal or external teeth.

Since the manufacture of the teeth, particularly internal teeth, is time-consuming and expensive, as an alternative to the keyed connection the coupling area is coupled in friction engagement with the drive wheel. The coupling areas of the coupling element and the circumference of the drive wheel are thereby designed accordingly, for example by coating with a friction lining so that the transfer of the required torque between the coupling element and drive wheel takes place through friction engagement.

The sliding block guide for controlling the coupling element is formed in one embodiment of the invention in a cover element of the drive.

In one development of the invention resilient elements are provided on both sides outside of the guide areas of the slide block and during movement of the drive lever towards the zero point position cause the coupling area which was previously loaded, to be lifted from the drive wheel. The spring force is thereby designed so that when the drive lever is moved out of the zero point position it allows the coupling areas to adjoin the drive wheel and at the same time guarantees that the coupling element is lifted when no force is introduced through the drive lever for adjusting the seat back for example.

For this, guide elements are arranged on the coupling element in the form of pins for example which are guided in the sliding block guide and which are in contact outside of the sliding block guide areas with resilient areas in order to engender the lifting movement of the coupling element in the absence of drive force so that no rattling or ratchet noises occur during the resetting movement. In a further development of the invention the guide elements have a non-rounded corner section so that during movement of the coupling element over the zero point position the reversing play is minimised.

A further development of the solution according to the invention is characterised in that a secondary force is exerted on the coupling element during an adjustment process such that when the drive lever is moved out of the zero point position torque is produced on the loaded coupling area in the direction of the drive wheel and when the drive lever is moved towards the zero point position torque is produced in the direction of lifting the loaded coupling area away from the drive wheel.

With this development of the solution according to the invention a more cost-effective play-free drive is provided which causes on one side a fixed coupling between the coupling area of the coupling element which is active in the relevant adjusting direction, and the drive wheel when the drive lever is moved out from the zero point position and on the other hand ensures a silent resetting of the drive lever back into the zero point position.

An advantageous development of this solution according to the invention for a drive where the coupling areas of the coupling element are formed as teeth, and toothing is provided on the circumference of the drive wheel associated with the teeth, is characterised in that when the drive lever is moved out from the zero point position torque is produced on the loaded coupling area in the sense of a toothed engagement and when the drive lever is moved in the direction of the zero point position torque is produced in the sense of separating the toothed engagement.

With this design of the invention on the one hand there is a fixed toothed engagement between the teeth of the coupling area of the coupling element which is active in the relevant adjusting direction and of the drive wheel when the drive lever is moved out from the zero point position and on the other it is guaranteed that the drive lever is reset into the zero point position without any ratchet noises.

A secondary force acts on the coupling element during an adjusting process to produce a torque in the direction of a reinforced coupling of the loaded coupling area and drive wheel when the drive lever is moved out of the zero point position. Likewise, a secondary force produces a torque in the direction of lifting the loaded coupling area from the drive wheel during movement of the drive lever in the direction of the zero point position. This secondary force is preferably achieved through axial tensioning of the coupling element, preferably outside of the zero point position of the drive lever.

This design ensures, in addition to a quasi play-free drive, a fixed coupling between the coupling element and drive wheel as well as the elimination of ratchet noises, that the coupling element in the zero point position is coupled with the drive wheel through the action of the spring acting on the coupling element and that the coupling element is fixed and thus no rattling or ratchet noises can occur.

Producing the axial tensioning of the coupling element is preferably carried out through at least one axially acting friction element which is mounted on the coupling element underneath the active line of the rotary point of the coupling element with the connection of the coupling areas to the drive wheel, is supported on a locally fixed part of the drive and in the zero point position of the drive lever is inactive so that the coupling areas are coupled to the drive wheel through the spring elastic connection of the coupling element with the drive lever.

Optionally two friction elements can be mounted on the coupling element one either side next to the drive lever and/or one friction element can be mounted centrally on the coupling element which engages through an opening in the drive lever.

The or each friction element is preferably formed as a leaf spring.

BRIEF DESCRIPTION OF THE DRAWINGS

The idea on which the invention is based will now be explained with reference to the embodiments shown in the drawings in which.

DETAILED DESCRIPTION

Figure 1:
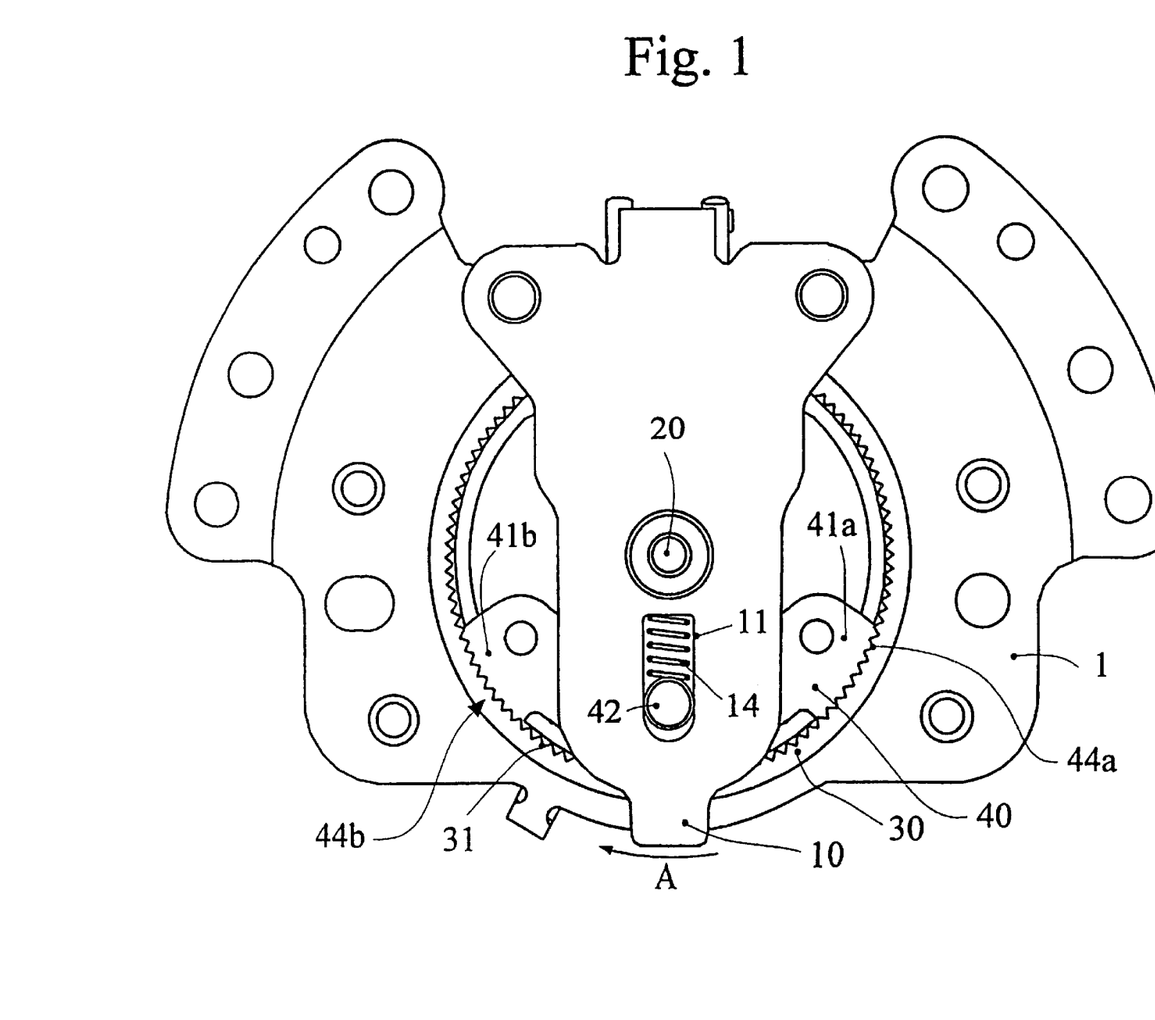
FIG. 1 is a plan view of an adjustment drive with a coupling element mounted on the drive lever.

FIG. 1 shows an adjustment drive with a housing secured against rotation where a drive lever 10 or component part 10 connectable to the drive lever is mounted rotatable on an axle 20. A recess 11 is punched out in the drive lever 10, which is shown shortened here, and a guide element 42 which is radially loaded by a spring 14 is guided in the recess. The guide element 42 which is here formed as a cylinder pin is moulded onto a coupling element 40 which is mounted between the housing 1 and drive lever 10.

The spring 14 presses the guide element 42 radially outwards from the axle 20 whereby the coupling element 40 is removed from the axle 20 at the same time. In this embodiment the spring is formed as a compression spring 14, but other types of springs, for example leaf or tensile springs as well as other spring elements such as rubber springs are fundamentally possible.

The radially displaceable coupling element 40 has two coupling areas 41a and 41b which are formed as teeth and which engage in corresponding internal teeth 31 of a drive wheel 30. The drive wheel 30 is located substantially in a plane with the coupling element 40 and is connected rotationally secured to a gear element (not shown) which is in active connection with further gear elements or steps of the adjusting device.

In the illustration of FIG. 1 the drive lever 10 is located in its zero point position and the spring 14 presses the coupling element 40 radially outwards so that both coupling areas 41a, 41b are in positive engagement with the internal teeth 31 in the toothed sections 44a, 44b. The radial mobility of the coupling element 40 is thereby not restricted by the dimensions of the recess 11 in the drive lever 10 so that a complete engagement of the teeth is possible in the direction of the drive wheel 30. The recess 11 is dimensioned in the direction of the axle 20 so that when the guide element 42 stops against same the two coupling areas 41a, 41b are brought straight out of engagement with the internal teeth 31.

When the drive lever 10 is operated in the direction of the arrow A a force acting in the direction of arrow A is exerted through the guide element 42 on the coupling element 40. This force acts on the coupling area 41b which is supported on the corresponding toothed section 44b of the internal teeth 31 of the drive wheel 30 and turns the drive wheel 30 about the axle 20. At the same time the coupling area 41a is lifted from the internal teeth 31 through a sliding block guide (not shown) so that the guide element 42 is moved in the recess 11 in the direction of the axle 20. During resetting of the drive lever 10 into the zero point position the coupling area 41b slides over the internal teeth and the coupling area 41a is held by the corresponding slide block guide out of engagement with the internal teeth 31 until the starting position illustrated in FIG. 1 is occupied again.

Through the pressing of the coupling element 40 through the spring 14 in the zero point position both coupling areas 41a, 41b are in engagement with the internal teeth 31 so that no idling path has to be covered up to the engagement of the teeth. The spring 14 furthermore has the effect that despite a movement of the drive lever 10 without actual adjustment of the drive wheel 30, the user does not have the feel of an idling path since when operating the drive lever 10 he is working against the resistance of the spring 14.

A corresponding sliding block guide fixed on the housing and in which guide elements are guided so that the coupling areas 41a, 41b during resetting movement of the drive lever 10 into the zero point position do not engage with the internal teeth 31, is not shown in FIG. 1 for reasons of clarity. The principle of the sliding block guide will be explained with reference to the following figures.

Figure 2:
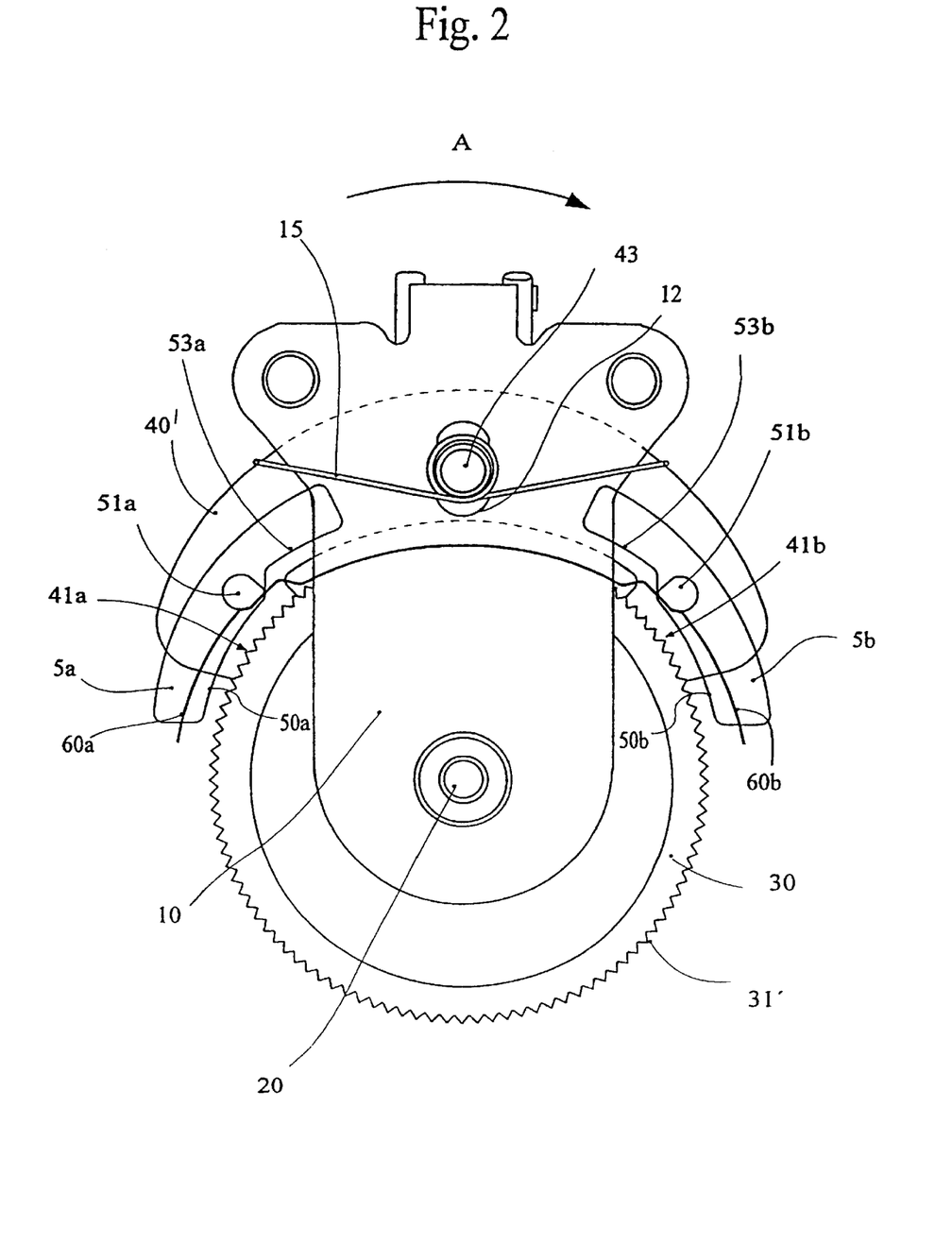
FIG. 2 shows an adjustment drive with an externally toothed drive wheel.

FIG. 2 shows an adjustment drive whose drive lever 10 is likewise mounted rotatable about an axle 20 and has a guide element 43 which is mounted in a radially extending recess 12 of the coupling element 40'. The drive wheel 30 is provided with external teeth 31' into which the corresponding coupling areas 41a, 41b of the coupling element 40' engage. A spring 15 is attached between the coupling element 40' and the guide element 43 mounted on the drive lever 10 and loads the coupling element 40' in the direction of the drive wheel 30 so that the two coupling areas 41a, 41b engage with the external teeth 31' in the starting position.

Two guide elements 51a, 51b are fixed on the coupling element 40' and are each guided in a sliding block guide 5a, 5b having sliding block guide areas 50a, 53a and 50b, 53b. Likewise a spring element 60a and 60b is associated with each guide element 51a, 51b wherein in the illustrated design the spring elements 60a, 60b are formed as a one-piece leaf spring. The spring elements 60a, 60b act against the spring 15, that is they press the area of the coupling element 40' which is unloaded when the drive lever 10 is returned, away from the external teeth 31'. However the spring elements 60a, 60b are designed and arranged so that in the zero point position of the drive lever 10 no force is exerted on the guide elements 51a, 51b, or the force is less than that of the spring 15 so that the coupling element 40' in the zero point position adjoins the external teeth 31'. On the other hand the force which is exerted on the guide elements 51a, 51b outside of the zero point position by the springs 60a, 60b is greater than the force emanating from the spring 15 so that the coupling area 41a, 41b which is unloaded at the time is lifted.

If the drive lever 10 is operated in the direction of the arrow A then a force is exerted through the guide element 43 on the coupling element 40'. The transition area between the sliding block guide areas 50a, 53a and 50b, 53b cause the coupling element 40' to tilt about the coupling area 41b so that the coupling element 40 is moved outwards against the force of the spring 15 along the recess 12 whereby the coupling area 41b remains engaged with the external teeth 31'. At the same time the drive wheel 30 is driven correspondingly through the rotational movement of the coupling element 40 about the axle 20 and the guide element 51b is moved in the sliding block 5b spaced from the contour of the sliding block guide area 50b. The spring element 60b is thereby pressed radially inwards through the force exerted on the drive lever 10.

As soon as no more force is introduced through the drive lever 10 in the direction of arrow A the spring element 60b presses the guide element 51b radially outwards. The free space over the sliding block guide area 50b enables the coupling area 41b to be lifted from the external teeth 31'. Through the force of the spring element 60b the coupling element 40' is turned about the guide element 51a which is located on the area 53a until the recess 12 stops the guide element 43. During the resetting movement of the drive lever the two coupling areas 41a, 41b are therefore not in engagement with the external teeth 31', namely the coupling area 41b as a result of the spring force of the spring element 60b and the coupling area 41a as a result of the sliding block guide area 53a which is spaced from the external teeth 31'. The resetting movement therefore takes place without any ratchet noise.

If the drive lever 10 is located in its zero point position then the spring 15 presses the coupling element 40' back in the direction of the axle 20 and brings the coupling areas 41a, 41b into engagement with the external teeth 31'.

Figure 3:
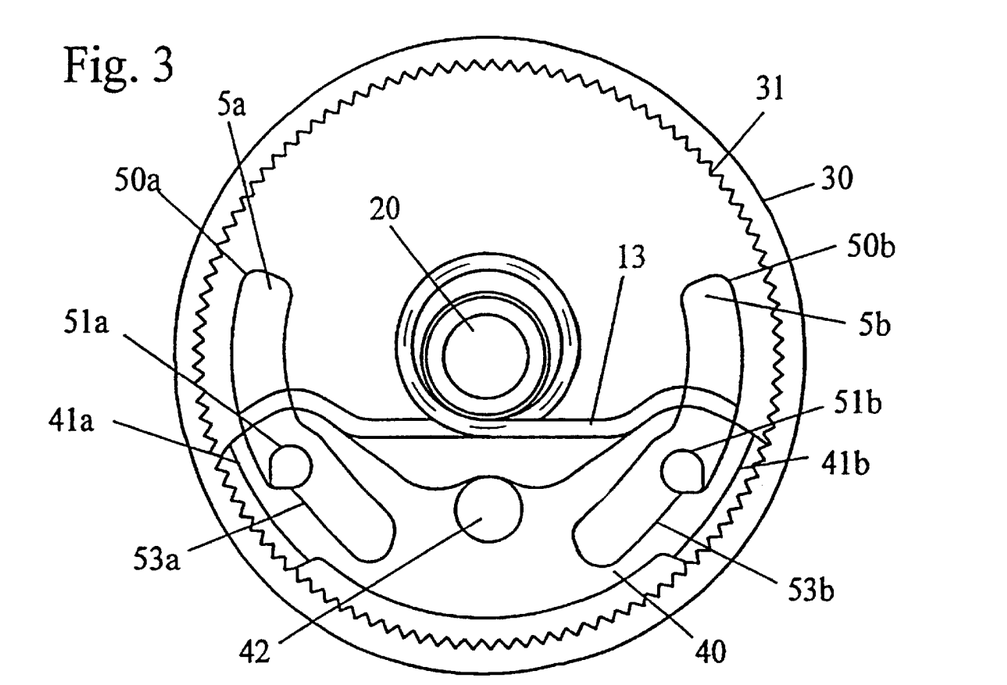
FIG. 3 shows an adjustment drive in the zero point position with a spring supported on the drive axle.
Figure 4:
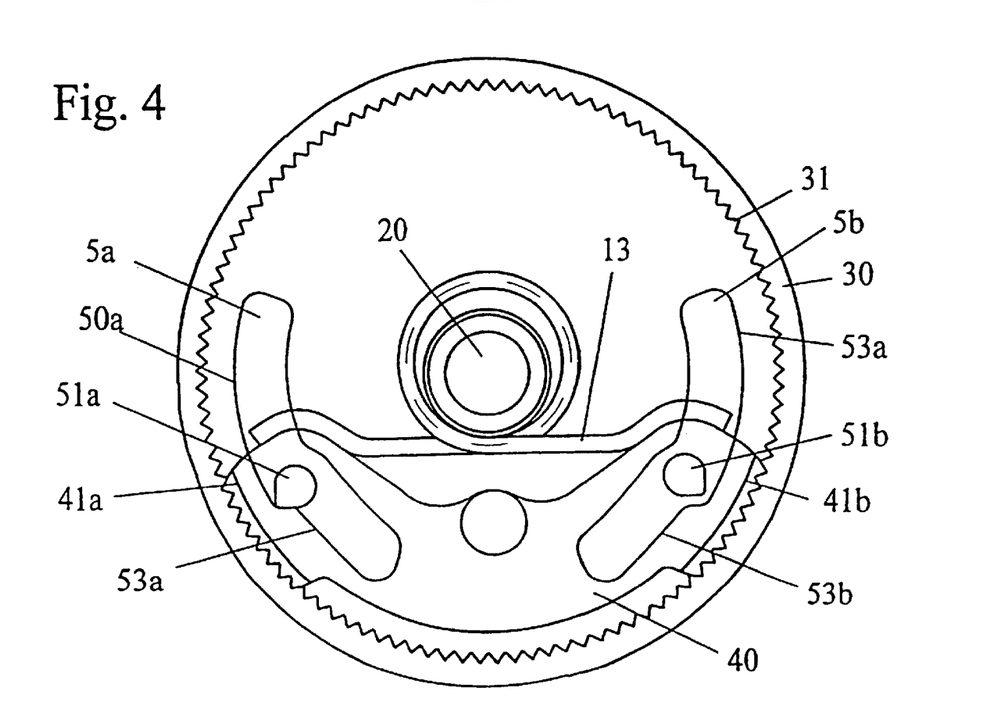
FIG. 4 shows an adjustment drive according to FIG. 3 in a slightly rotated position wherein the non-loaded coupling area is just lifted from the drive wheel.

FIG. 3 shows an adjustment drive with an internally toothed drive wheel 30 wherein each one sliding block guide 5a, 5b fixed on the housing is in engagement with the guide elements 51a, 51b mounted on the coupling element 40 analogous with FIG. 2. The spring 13 which is mounted here on the axle 20 of the drive presses the coupling element 40 radially outwards in the direction of the internal teeth 31 of the drive wheel 30. The spring 13 thus acts corresponding to the spring 11 in FIG. 1. Movement of the drive lever (not shown) counter-clockwise engenders a corresponding movement of the coupling element 40 and of the drive wheel 30, as shown in FIG. 4.

The coupling element 40 is thereby turned slightly about the axle 20 and the guide element 51a has been displaced along the shoulder between the sliding block guide area 50a and the sliding block guide area 53a. The coupling area 41a has just been lifted from the internal teeth 31 of the drive wheel 30 against the externally acting force of the spring 13 as a result of the geometric dimensions of the sliding block guide 5a. The coupling area 41b is thereby in engagement with the internal teeth 31 and drives the drive wheel 30.

The coupling element 40 has a guide element 42 which corresponding to the arrangement in FIG. 1 is guided in a recess (not shown) through which the rotational movement about the coupling area 41a is restricted.

When resetting the drive lever into the zero point position the coupling area 41b remains in engagement with the internal teeth 31. Since however the force through the spring still only presses the coupling element 40 radially outwards the coupling area 41b slides along on the internal teeth 31 so that ratchet noise is produced. The coupling area 41a which is relaxed during adjustment remains as a result of the sliding block guide 5a out of engagement with the internal teeth 31. Only when or shortly before reaching the zero point position does the guide element 51a move from the area 53a towards the internal teeth 31 and come into engagement with same.

It is obviously possible to make the guide elements 51a, 51b fixed relative to the housing and to provide a sliding block guide on the coupling element 40.

Figure 5:
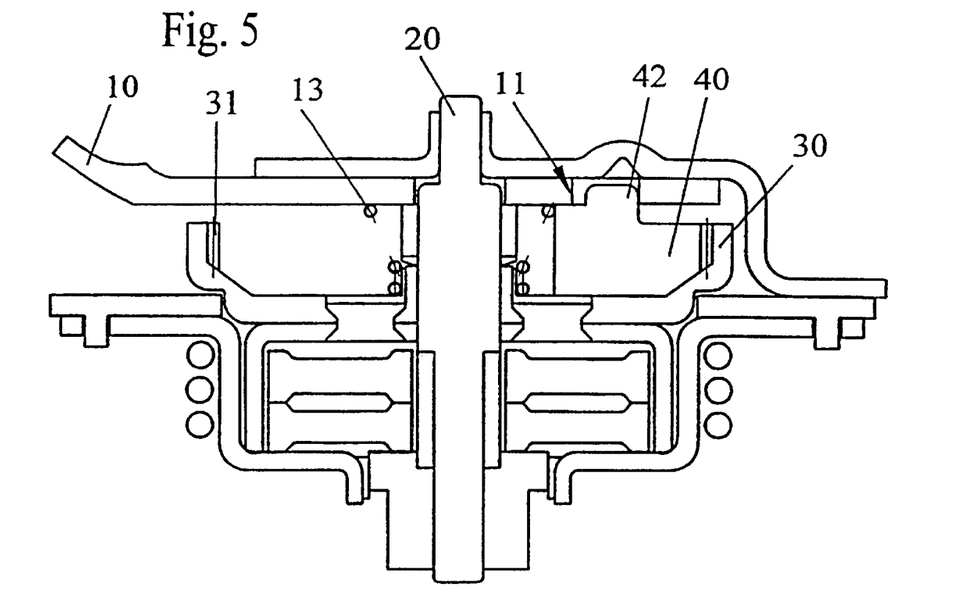
FIG. 5 shows an adjustment drive according to FIG. 3 in a sectional view.

FIG. 5 shows a sectional view of FIG. 3 in which the arrangement of the drive lever 10 above the spring 13 and the coupling element 40 can be seen. The recess 11 is stamped or milled in the drive lever 10 whereby the guide element 42 which is formed integral with the coupling element 40 is guided in the recess. The recess 11 causes in interaction with the spring 13 a radially outwardly directed movement of the coupling element 40 and thus causes the coupling areas to adjoin the internal teeth 31 in the zero point position.

Figure 6:
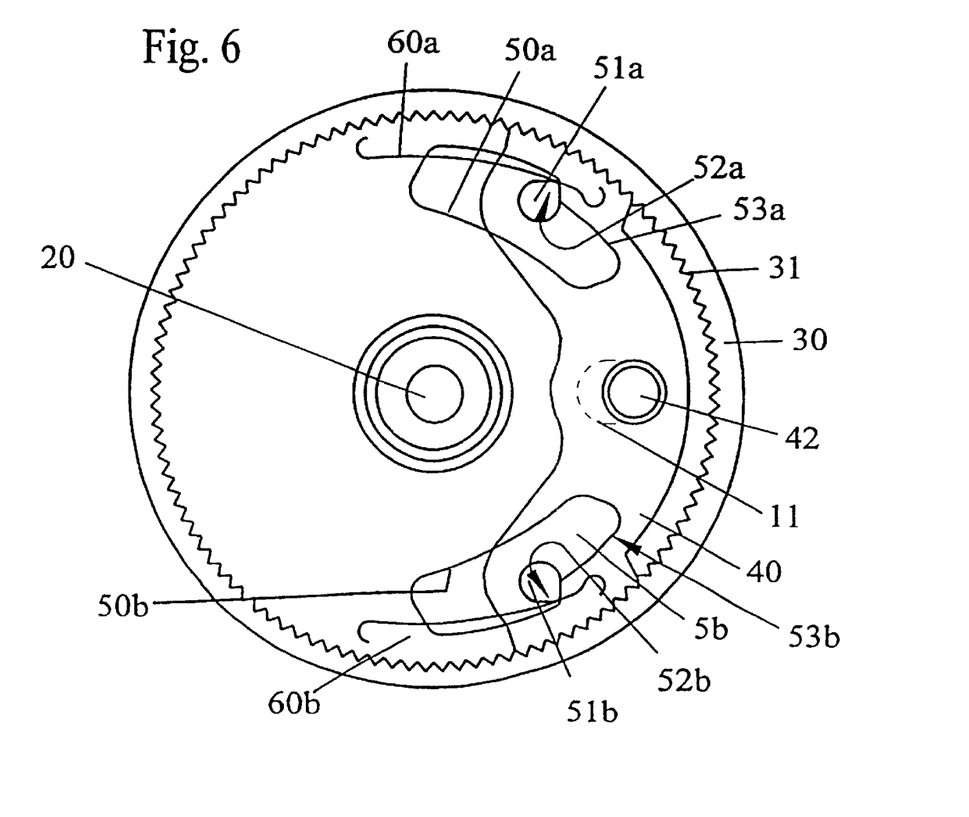
FIG. 6 shows an adjustment drive with springs fixed on the housing for the silent resetting of the coupling element back into the zero point position.

One variation of the invention in which there is likewise no ratchet noise when the drive lever 10 is reset is shown in FIG. 6. The work principle thereby corresponds to that of the drive illustrated in FIG. 2, where the reference numerals correspond to those of FIG. 2 and the relevant elements have the same function as described in connection with FIG. 2. As opposed to the drive according to FIG. 2 here according to FIG. 6 the coupling element 40 is located as with the drive according to FIG. 1 inside the drive wheel 30. Guide elements 51a, 51b are formed on the coupling element 40 and engage in a sliding block guide 5a, 5b.

Figure 7:
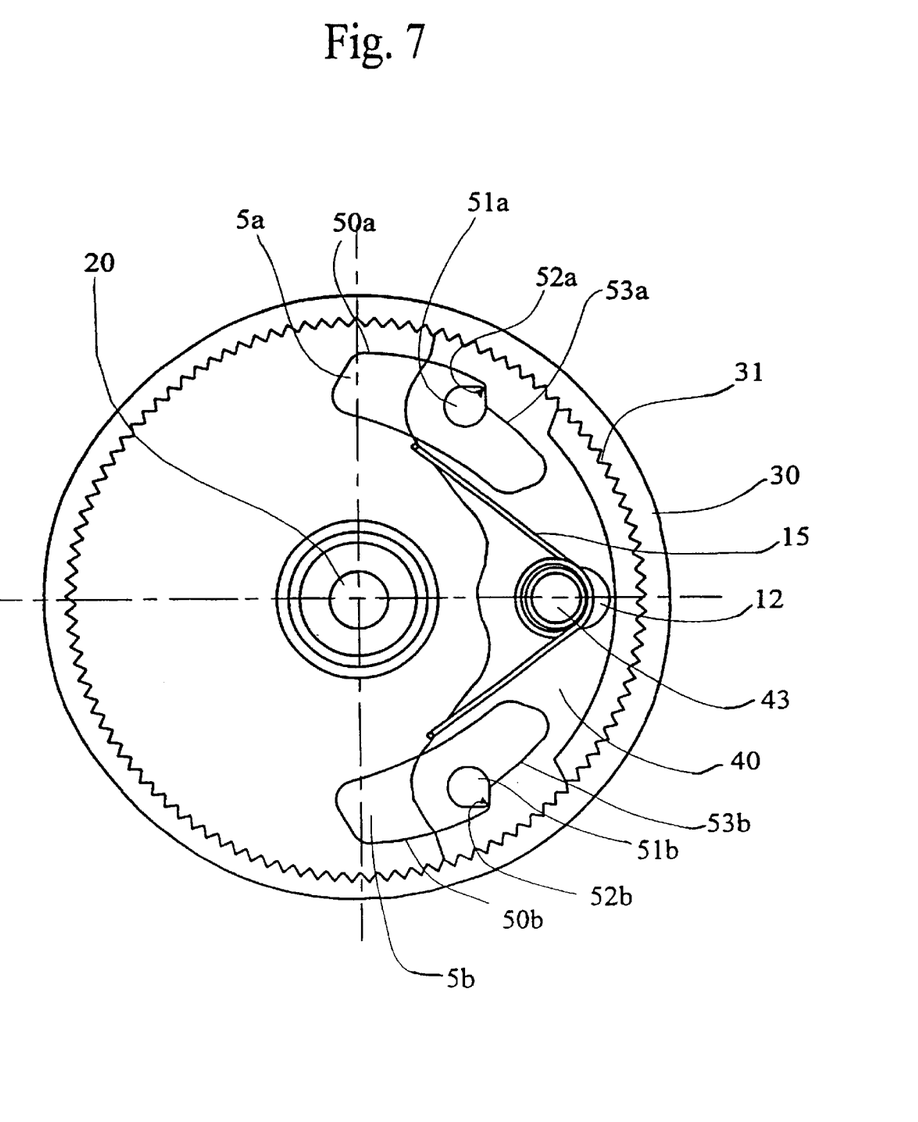
FIG. 7 shows an adjustment drive with a spring between the coupling element and the guide element mounted on the drive lever.

In FIG. 7 the coupling element 40 has a recess 12 and the spring 15 is mounted on the guide element 43 which is formed on the drive lever. Guide elements 51a and 51b have corner sections 52a and 52b. The spring 15 causes a constant abutment of the coupling element 40 against the internal teeth 31 if the coupling element 40 is located in the zero point position. A displacement out of the zero point position leads to a coupling area 41a, 41b lifting away from the internal teeth 31. During resetting into the zero point position the coupling area 41a, 41b which is loaded during the adjustment slides along on the internal teeth 31 until the starting position shown in FIG. 7 is reached.

Figure 8:
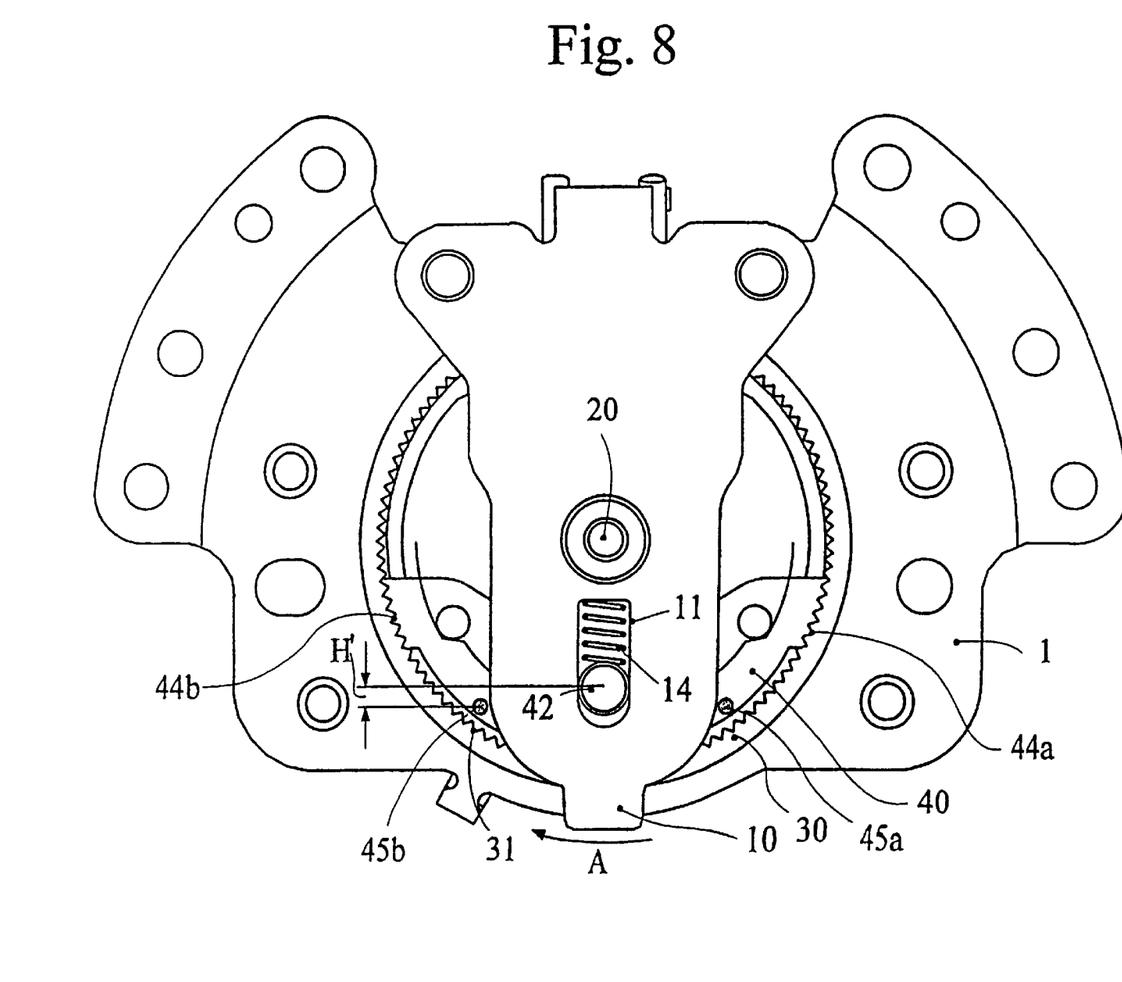
FIG. 8 shows an adjustment drive with friction elements mounted at the side of the drive lever on the coupling element.

FIG. 8 shows a plan view of an adjustment drive which corresponds to the adjustment device according to FIG. 1 where the same reference numerals designate the same function elements of the adjustment drive according to FIG. 1.

Differently from the design of the adjustment drive according to FIG. 1, in the adjustment drive illustrated in FIG. 8 however both coupling areas 41a, 41b of the coupling element 40 are provided with friction elements 45a, 45b which are arranged on either side of the drive lever 10. The friction elements 45a, 45b can be fixed on the coupling areas 41a, 41b or are formed integral on the coupling area 41a, 41b and are located underneath the active line of the guide element 42 forming the rotational point of the coupling element 40 and of the toothed engagement of the toothed sections 44a, 44b of the coupling areas 41a, 41b with the internal teeth 31 of the drive wheel 30 so that a lever arm H is formed which during movement of the drive lever 10 out from the zero point position or during movement of the drive lever 10 into the zero point position cause a corresponding torque which acts on the relevant coupling area 41a, 41b of the coupling element 40.

The friction elements 45a, 45b are supported on a locally fixed part of the adjustment drive, for example on the housing of the adjustment drive so that an axial tensioning of the coupling element 40 is caused and during movement of the drive lever 10 out from the zero point position causes a torque on the active side of the coupling element 40, that is on the side which corresponds to the direction of rotation of the drive lever 10, in the direction of a toothed engagement of the relevant coupling area 41a or 41b with the internal teeth 31 of the drive wheel 30, whilst during resetting of the drive lever 10 into the zero point position torque arises on this coupling area 41a, 41b or the toothed section 44a, 44b associated therewith in the direction of lifting the relevant toothed section 44a, 44b out of the internal teeth 31 of the drive wheel 30.

During movement of the drive lever 10 in the direction of arrow A, through the action of the axially tensioned friction element 45b the toothed section 44b of the coupling area 41b is pressed into the internal teeth 31 of the drive wheel 30 whilst during resetting of the drive lever 10 into the zero point position against the direction of arrow A the torque caused by the friction element 45b leads to the toothed section 44b lifting out from the internal teeth 31 of the drive wheel 30. The toothed section 44a is lifted out from the internal teeth 31 of the drive wheel 30 during the movement of the drive lever 10 described above in the direction of the arrow A out from the zero point position or during the movement of the drive lever 10 in the direction of the zero point position analogous with the explanation on the adjustment drive according to FIG. 1.

In the zero point position of the drive lever 10 the friction elements 45a, 45b are inactive, that is they are not axially tensioned and the spring 14 can press the coupling element 40 radially outwards and thus in the zero point position of the drive lever 10 both coupling areas 41a and 41b of the coupling element 40 are in engagement with the internal teeth 31 of the drive wheel 30.

The arrangement of the friction elements 45a, 45b causes on the one hand a play-free adjustment drive which during resetting of the drive lever 10 into the zero point position causes no ratchet noises to arise and on the other a fixing of the coupling element 40 so that no rattling or ratchet noises can arise as a result of the required axial play.

The friction elements 45a, 45b are preferably formed as leaf springs which are supported on one side on the coupling areas 41a and 41b and on the other for example on the housing of the adjustment drive.

Figure 9:
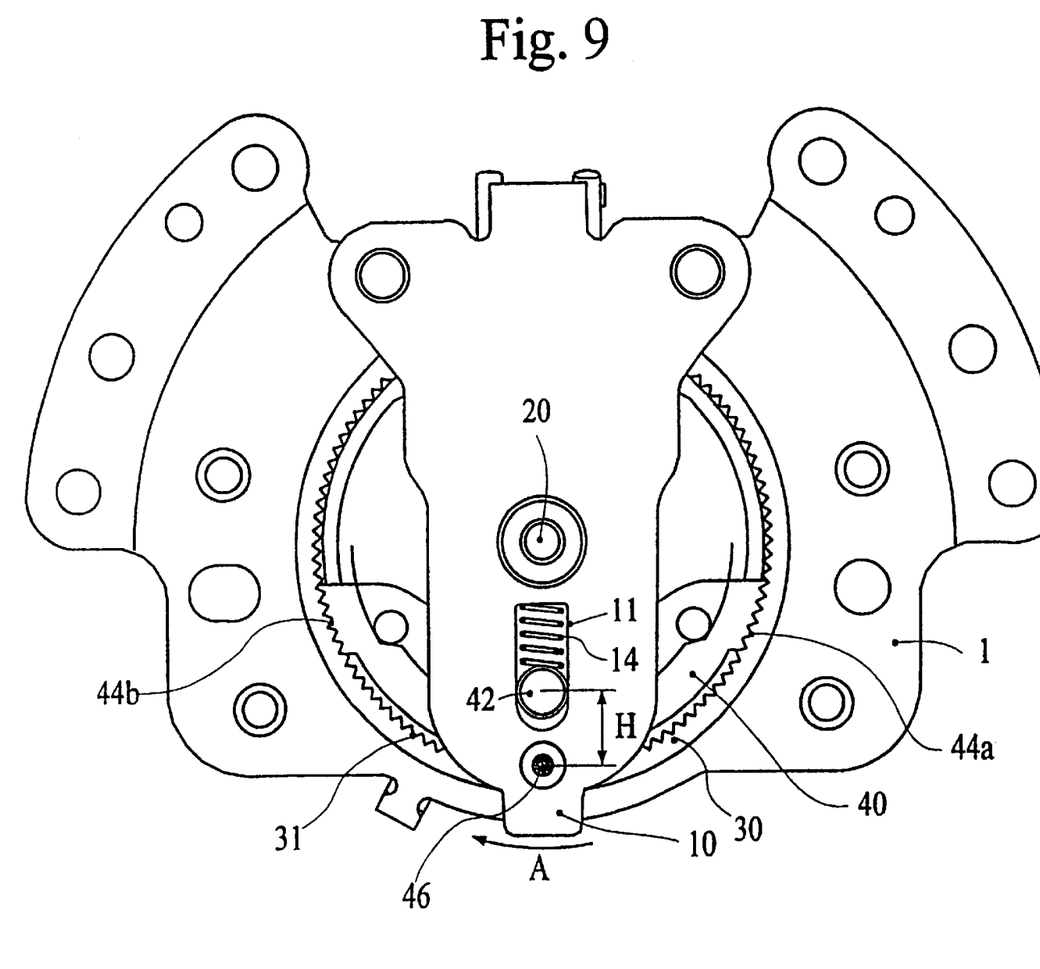
FIG. 9 shows an adjustment drive with a friction element mounted centrally on the coupling element and engaging through an opening in the drive lever.

FIG. 9 shows an alternative to the arrangement according to FIG. 8 with a friction element 46 attached centrally on the coupling element 40' and which engages through an opening 16 in the drive lever 10 and is likewise supported on a locally fixed part of the adjustment drive, preferably on the housing of the adjustment drive.

The action of this one central friction element 46 corresponds to the action of the two friction elements 45a, 45b mounted on the coupling element 40 at the sides of the drive lever 10, according to FIG. 8, and is likewise mounted underneath the active line of the rotational point of the coupling element 40 formed by the guide element 42, and the toothed engagement of the toothed sections 44a, 44b of the coupling areas 41a, 41b with the internal teeth 31. The distance H' between the friction element 46 and the guide element 42 which (distance) is greater in this embodiment compared with the embodiment of FIG. 8, forms the lever arm for the torque for lifting the coupling area 41a or 41b to reinforce the toothed engagement of each active coupling area 41a, 41b or for lifting the relevant toothed area 44a, 44b out from the internal teeth 31 during the return of the lever arm 10 into the zero point position.

As a further alternative a combination of the embodiments according to FIGS. 8 and 9 is possible, that is the arrangement of three friction elements 45a, 45b and 46, of which two friction elements connected to the coupling element 40 are arranged at the side of the drive lever 10, whilst a central friction element is provided corresponding to the friction element 46 according to FIG. 9 on the coupling element 40'. All the friction elements 45a, 45b, 46 are axially tensioned outside of the zero point position of the drive lever 10, whilst in the zero point position the friction elements 45a, 45b and 46 are inactive so that the spring 14 presses the guide element 42 outwards, that is presses both toothed sections 44a, 44b of the coupling areas 41, 41b into the internal teeth 31 of the drive wheel 30.

Also the central friction element 46 according to FIG. 9 consists preferably of a leaf spring which is fixed on the coupling element 40, engages through the opening 16 of the drive lever 10 and is supported on a locally fixed element of the adjustment drive.

What is claimed is:

1. A drive acting on both sides for an adjustment device, comprising:
   a swivel mounted drive lever for producing a rotary movement which starting from a zero point position of the drive lever can take place selectively into a first rotary direction and into a second opposite rotary direction;
   a drive wheel which is rotated during movement of the drive lever out from the zero point positions;
   at least one coupling element mounted on the drive lever and having two coupling areas for transferring torque to the drive wheel; and
   a sliding block guide with sliding block guide areas for controlling the at least one coupling element,
   wherein the at least one coupling element is mounted radially displaceable and able to tilt in a coupling element guide and is coupled spring elastically with the drive wheel through the two coupling areas in the zero point position of the drive lever so that during movement of the drive lever out from the zero point position at least one of the coupling areas is non-loaded and is uncoupled from the drive wheel through the sliding block guide and during movement of the drive lever in the direction of the zero point position remains uncoupled.

2. The drive according to claim 1 wherein the at least one coupling element is connected to a guide element which engages in a radially extending recess of the drive lever.

3. The drive according to claim 1 wherein the drive lever is connected to a guide element which engages in a radially extending recess of the at least one coupling element.

4. The drive according to claim 2 or 3 wherein the guide element is connected to the radially extending recess through a slide block.

5. The drive according to claim 2 wherein the recess is measured so that the at least one coupling element is movable radially so far that the two coupling areas are not coupled to the drive wheel.

6. The drive according to claim 1 wherein a spring is mounted between a housing and the at least one coupling element.

7. The drive according to claim 1 wherein a spring is mounted between the drive lever and the at least one coupling element.

8. The drive according to claim 7 wherein the spring is mounted between the drive lever and a guide element.

9. The drive according to claim 7 wherein the spring is mounted between a guide element and the at least one coupling element.

10. The drive according to claim 1 wherein the coupling areas of the at least one coupling element are formed as teeth associated with a corresponding toothing on the circumference of the drive wheel.

11. The drive according to claim 10 wherein the teeth of the drive wheel are formed as one of the group of internal teeth and external teeth.

12. The drive according to claim 1 wherein the coupling areas of the at least one coupling element and a circumference of the drive wheel are designed so that the transfer of torque between the at least one coupling element and the drive wheel takes place with friction engagement.

13. The drive according to claim 1 wherein the sliding block guide is formed in a cover element.

14. The drive according to claim 1 wherein spring areas are arranged on each side of the drive outside of the sliding block guide areas and exert on the at least one coupling element a force acting against a locking direction, with the force measured so that a coupling area which is loaded when the drive lever moves out from the zero point position is not lifted from the drive wheel but is lifted during movement towards the zero point position.

15. The drive according to claim 1 wherein on the at least one coupling element there are guide elements which are guided in the sliding block guide and which outside of the sliding block guide areas are in contact with spring areas.

16. The drive according to claim 15 wherein the guide elements have a non-rounded corner section.

17. The drive according to claim 1 wherein the drive is arranged such that a secondary force acts on the at least one coupling element during an adjusting process so that when the drive lever is moved out from the zero point position a torque is produced on a loaded coupling area in the direction of the drive wheel and when the drive lever is moved towards the zero point position a torque is produced in the sense of lifting the loaded coupling area away from the drive wheel.

18. The drive according to claim 17 wherein the two coupling areas of the at least one coupling element are formed as teeth and a toothed area on a circumference of the drive wheel is associated with the teeth, wherein when the drive lever is moved out of the zero point position torque is produced on a loaded coupling area in a direction of a toothed engagement and when the drive lever is moved towards the zero point position torque is produced in a direction of separating the toothed engagement.

19. The drive according to claim 17 wherein the at least one coupling element is axially tensioned.

20. The drive according to claim 19 wherein the at least one coupling element is tensioned in the axial direction outside of the zero point position of the drive lever.

21. The drive according to claim 17 wherein at least one axially acting friction element is mounted on the at least one coupling element and is inactive in the zero point position of the drive lever so that the two coupling areas are coupled to the drive wheel through the spring-elastic connection between the at least one coupling element and the drive wheel.

22. The drive according to claim 21 wherein two friction elements are mounted on the at least one coupling element at the side of the drive next to the drive lever.

23. The drive according to claim 21 wherein the at least one axially acting friction element is mounted centrally on the at least one coupling element.

24. The drive according to claim 23 wherein the at least one axially acting friction element mounted centrally on the at least one coupling element engages through an opening in the drive lever.

25. The drive according to claim 21 wherein the at least one axially acting friction element is supported on a locally fixed part of the drive.

26. The drive according to claim 21 wherein the at least one axially acting friction element is mounted on the at least one coupling element underneath an active line of a rotary point of the at least one coupling element with the coupling of the two coupling areas with the drive wheel.

27. The drive according to claim 21 wherein the at least one axially acting friction element is formed as a leaf spring.

* * * * *